United States Patent
Yano et al.

(10) Patent No.: US 10,256,478 B2
(45) Date of Patent: Apr. 9, 2019

(54) STAINLESS STEEL SHEET FOR SEPARATOR OF POLYMER ELECTROLYTE FUEL CELL

(71) Applicant: JFE STEEL CORPORATION, Chiyoda-ku, Tokyo (JP)

(72) Inventors: Takayoshi Yano, Tokyo (JP); Shin Ishikawa, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/546,383

(22) PCT Filed: Dec. 18, 2015

(86) PCT No.: PCT/JP2015/006331
§ 371 (c)(1),
(2) Date: Jul. 26, 2017

(87) PCT Pub. No.: WO2016/120938
PCT Pub. Date: Aug. 4, 2016

(65) Prior Publication Data
US 2018/0026276 A1    Jan. 25, 2018

(30) Foreign Application Priority Data

Jan. 29, 2015 (JP) ................. 2015-015839

(51) Int. Cl.
| | | |
|---|---|---|
| H01M 8/04 | (2016.01) | |
| H01M 8/0245 | (2016.01) | |
| C25D 5/48 | (2006.01) | |
| C25D 7/00 | (2006.01) | |
| H01M 8/10 | (2016.01) | |
| H01M 8/0202 | (2016.01) | |
| C25D 3/60 | (2006.01) | |
| H01M 8/0232 | (2016.01) | |
| H01M 8/0208 | (2016.01) | |
| H01M 8/1018 | (2016.01) | |

(52) U.S. Cl.
CPC ............ *H01M 8/0245* (2013.01); *C25D 3/60* (2013.01); *C25D 5/48* (2013.01); *C25D 7/00* (2013.01); *H01M 8/0202* (2013.01); *H01M 8/0208* (2013.01); *H01M 8/0232* (2013.01); *H01M 8/10* (2013.01); *H01M 2008/1095* (2013.01)

(58) Field of Classification Search
CPC ............ H01M 8/0245; H01M 8/0202; H01M 8/0208; H01M 8/0232; H01M 8/10; H01M 2008/1095; C25D 3/60; C25D 5/48; C25D 7/00
See application file for complete search history.

(56) References Cited

U.S. PATENT DOCUMENTS

| | | |
|---|---|---|
| 4,865,700 A | 9/1989 | Sovran et al. |
| 2013/0177837 A1 | 7/2013 | Nishiyama et al. |

FOREIGN PATENT DOCUMENTS

| | | | |
|---|---|---|---|
| JP | H08180883 A | 7/1996 | |
| JP | H10228914 A | 8/1998 | |
| JP | 2012178324 A | 9/2012 | |
| JP | 2013-243113 | * 12/2013 | ............... C22C 1/10 |
| JP | 2013243113 A | 12/2013 | |
| JP | 2014136832 A | 7/2014 | |

OTHER PUBLICATIONS

Mar. 1, 2016, International Search Report issued in the International Patent Application No. PCT/JP2015/006331.

* cited by examiner

*Primary Examiner* — Raymond Alejandro
(74) *Attorney, Agent, or Firm* — Kenja IP Law PC

(57) ABSTRACT

A stainless steel sheet for a separator of a polymer electrolyte fuel cell includes a substrate made of stainless steel and a Sn alloy layer with which a surface of the substrate is coated. The Sn alloy layer includes 10 or more and 10,000 or fewer microcracks per $cm^2$, where the microcrack is defined as a crack having a crack width that is at least 0.1 times the thickness of the Sn alloy layer and no more than 10 μm.

16 Claims, 1 Drawing Sheet

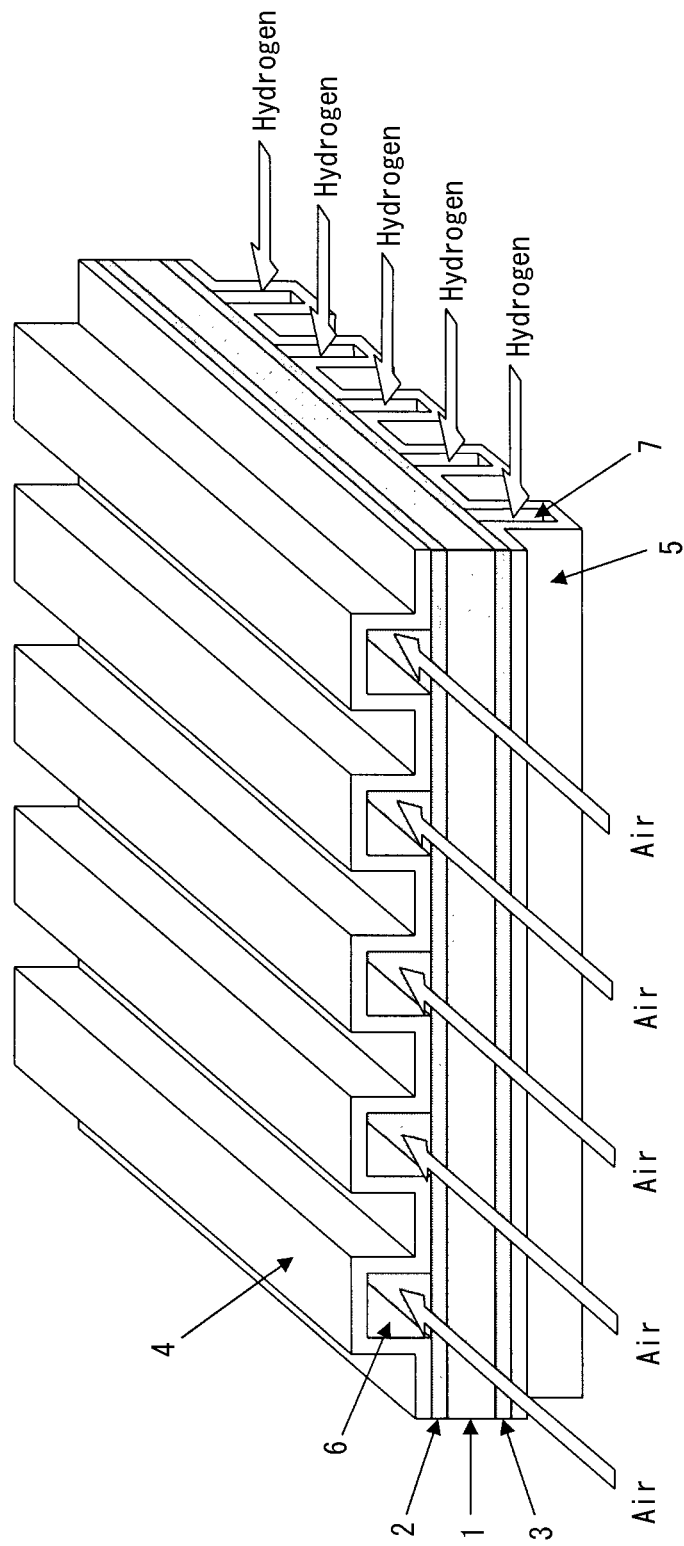

STAINLESS STEEL SHEET FOR SEPARATOR OF POLYMER ELECTROLYTE FUEL CELL

TECHNICAL FIELD

This disclosure relates to a stainless steel sheet for a separator (bipolar plate) of a polymer electrolyte fuel cell having excellent corrosion resistance and adhesion.

BACKGROUND

In recent years, the development of fuel cells that have excellent generation efficiency and emit no $CO_2$ has proceeded with the goal of global environment protection. A fuel cell generates electricity from $H_2$ and $O_2$ through an electrochemical reaction. The fuel cell has a sandwich-like basic structure and includes an electrolyte membrane (ion-exchange membrane), two electrodes (fuel electrode and air electrode), gas diffusion layers for $O_2$ (air) and $H_2$, and two separators.

Fuel cells are classified as phosphoric acid fuel cells, molten carbonate fuel cells, solid oxide fuel cells, alkaline fuel cells, and polymer electrolyte fuel cells (PEFCs; proton-exchange membrane fuel cells) according to the type of electrolyte membrane used. Development of each of these types of fuel cells is ongoing.

Of these fuel cells, polymer electrolyte fuel cells have, for example, the following advantages over other fuel cells.

(a) The fuel cell operating temperature is about 80° C., which enables electricity generation at a remarkably low temperature.

(b) The fuel cell body can be made lighter and smaller.

(c) The fuel cell can be started promptly, and has high fuel efficiency and power density.

Use of polymer electrolyte fuel cells is therefore anticipated in electric vehicle power sources, home or industrial stationary generators, and portable small generators.

A polymer electrolyte fuel cell generates electricity from $H_2$ and $O_2$ via a polymer membrane. As illustrated in FIG. 1, a membrane-electrode joined body 1 is sandwiched between gas diffusion layers 2 and 3 (for example, carbon paper) and separators 4 and 5, forming a single component (referred to as a "single cell"). An electromotive force is generated between the separators 4 and 5.

The membrane-electrode joined body 1 is called a membrane-electrode assembly (MEA). The membrane-electrode joined body 1 is an assembly of a polymer membrane and an electrode material such as a carbon black-supported platinum catalyst on the front and back surfaces of the membrane, and has a thickness of the order of tens to hundreds of micrometers. The gas diffusion layers 2 and 3 are often integrated with the membrane-electrode joined body 1.

In actual use of polymer electrolyte fuel cells, tens to hundreds of single cells such as the above are typically connected in series to form a fuel cell stack and are used in this form.

The separators 4 and 5 are required to function not only as (a) partition walls separating single cells, but also as (b) conductors carrying generated electrons, (c) air passages 6 through which $O_2$ (air) flows and hydrogen passages 7 through which $H_2$ flows, and (d) exhaust passages through which produced water or gas is discharged (the air passages 6 and hydrogen passages 7 also serve as the exhaust passages).

Therefore, the separators 4 and 5 need to have excellent durability and electrical conductivity.

A durability of about 5,000 hours is expected in the case of a polymer electrolyte fuel cell that is used as a power source in an electric vehicle, whereas a durability of about 40,000 hours is expected in the case of a polymer electrolyte fuel cell that is used as a home stationary generator or the like. Therefore, the separators are required to have sufficient corrosion resistance for withstanding long-term generating, because dissolved metal ions due to corrosion may reduce the proton conductivity of the polymer membrane (electrolyte membrane).

Regarding electrical conductivity, the contact resistance between the separator and the gas diffusion layer is preferably as low as possible, because an increase in contact resistance between the separator and the gas diffusion layer lowers generation efficiency of the polymer electrolyte fuel cell. In other words, lower contact resistance between the separator and the gas diffusion layer contributes to better power generation characteristics.

Polymer electrolyte fuel cells using graphite as separators have already been commercialized. Separators made of graphite are advantageous in that contact resistance is relatively low and also that corrosion does not occur. However, separators made of graphite easily break by impact, and so are disadvantageous in that size reduction is difficult and processing cost for forming air passages and hydrogen passages is high. These drawbacks of separators made of graphite hinder the widespread use of polymer electrolyte fuel cells.

Attempts have been made to use a metal material as the separator material instead of graphite. In particular, various studies have been conducted to commercialize separators made of stainless steel, titanium, a titanium alloy, or the like for enhanced durability.

For example, Patent Literature (PTL) 1 discloses a technique of using, for separators, a metal such as stainless steel or a titanium alloy that easily forms a passive film. The formation of the passive film, however, causes an increase in contact resistance, and leads to lower generation efficiency. These metal materials have thus been pointed out to have problems that require mitigation such as high contact resistance and poor corrosion resistance as compared with graphite materials.

PTL 2 discloses a technique of plating the surface of a metal separator such as an austenitic stainless steel sheet (SUS304) with gold to reduce the contact resistance and ensure high output. However, a thin gold plating is susceptible to formation of pinholes, whereas a thick gold plating is problematic in terms of cost.

To solve these problems, we previously proposed, in PTL 3, "a metal sheet for a separator of a polymer electrolyte fuel cell wherein a film of a Sn alloy layer is formed on the surface of a metal substrate and the film contains conductive particles".

CITATION LIST

Patent Literature

PTL 1: JP H8-180883 A
PTL 2: JP H10-228914 A
PTL 3: JP 2012-178324 A

SUMMARY

Technical Problem

Through the development of the metal sheet for a separator of a polymer electrolyte fuel cell described in PTL 3, we succeeded in improving corrosion resistance in the use environment of separators of polymer electrolyte fuel cells.

However, it has become clear that in formation of the film of a Sn alloy layer (hereinafter, this film is also referred to simply as a "Sn alloy layer") on the metal substrate, it may not be possible to form a sound Sn alloy layer on the surface of the metal substrate and defects may be generated in the Sn alloy layer as a result of surface defects, such as scratches and surface roughness, generated during production of the metal substrate or forming of the metal substrate into a desired shape. In a situation in which the metal substrate becomes exposed due to generation of a defect in the Sn alloy layer as described above (particularly in the case of a stainless steel substrate), the exposed part of the substrate may be more susceptible to corrosion if the use environment of the fuel cell separator is contaminated with chloride ions from the external environment. Moreover, this corrosion may lead to formation of a hole in the substrate.

In view of the current situation set forth above, it could be helpful to provide a stainless steel sheet for a separator of a polymer electrolyte fuel cell having excellent corrosion resistance, that can prevent the formation of holes in a stainless steel substrate due to localized corrosion even when the use environment of the separator of the polymer electrolyte fuel cell is contaminated with chloride ions from the external environment or the like.

Solution to Problem

Using stainless steel as a material of a separator for a polymer electrolyte fuel cell, we conducted diligent investigation of defect parts of a Sn alloy layer and corrosion behavior of defect parts of a Sn alloy layer in the use environment of fuel cell separators, with the objective of solving the problems set forth above.

As a result, we made the following discoveries.

(1) First, we investigated corrosion behavior in the use environment of fuel cell separators when contamination with chloride ions from the external environment occurs. As a result, we found that in an environment in which contamination with chloride ions occurs, and particularly in which lowering of pH and concentration of chloride ions easily occurs, the presence of a defect in the Sn alloy layer and an exposed part of the stainless steel substrate may result in preferential corrosion of the exposed part of the substrate, leading to formation of a hole in the substrate.

(2) Next, we conducted a detailed investigation into the cause of localized corrosion leading to formation of a hole in the substrate in an environment such as described above. Through this investigation, we reached the conclusion that because the stainless steel substrate is more susceptible to corrosion than the Sn alloy layer in this environment, corrosion current tends to concentrate at an exposed part of the stainless steel substrate as compared to a Sn alloy layer part, leading to formation of a hole in the substrate.

(3) We attempted, therefore, to disperse the corrosion current in order to prevent the corrosion current from concentrating at the exposed part of the stainless steel substrate and conducted further investigation in relation to effective methods for achieving this goal.

Through this investigation, we discovered that by intentionally providing microcracks in the Sn alloy layer in an amount of 10 or more microcracks per cm$^2$, localized corrosion of an exposed part of the stainless steel substrate can be inhibited, and thus hole formation in the stainless steel substrate can be effectively prevented.

(4) We consider the reason for this discovery to be as follows. As a result of microcracks being provided in the Sn alloy layer in an amount of 10 or more microcracks per cm$^2$, the corrosion current that flows preferentially in a defect part of the Sn alloy layer (i.e., an exposed part of the stainless steel substrate) caused by a surface defect of the stainless steel substrate or the like, is also dispersed uniformly in the microcracks. This can effectively inhibit localized corrosion of the exposed part of the stainless steel substrate, and can thus effectively prevent hole formation in the stainless steel substrate.

This disclosure is based on the above discoveries and further studies.

Specifically, the primary features of this disclosure are as follows.

1. A stainless steel sheet for a separator of a polymer electrolyte fuel cell, comprising:
   a substrate made of stainless steel; and
   a Sn alloy layer with which a surface of the substrate is coated, wherein
   the Sn alloy layer includes 10 or more microcracks per cm$^2$.

2. The stainless steel sheet for a separator of a polymer electrolyte fuel cell according to the foregoing 1, wherein the Sn alloy layer contains at least one element selected from Ni and Fe.

3. The stainless steel sheet for a separator of a polymer electrolyte fuel cell according to the foregoing 1 or 2, wherein
   the Sn alloy layer contains Ni$_3$Sn$_2$.

4. The stainless steel sheet for a separator of a polymer electrolyte fuel cell according to any one of the foregoing 1 to 3, further comprising
   a strike layer between the Sn alloy layer and the substrate made of stainless steel.

5. The stainless steel sheet for a separator of a polymer electrolyte fuel cell according to any one of the foregoing 1 to 4, further comprising a Sn-containing oxide layer on a surface of the Sn alloy layer.

Advantageous Effect

Accordingly, it is possible to obtain a separator for a polymer electrolyte fuel cell having excellent corrosion resistance, that can prevent hole formation in a stainless steel substrate due to localized corrosion even when the use environment of the separator of the polymer electrolyte fuel cell is contaminated with chloride ions from the external environment or the like.

Moreover, adoption of a fuel cell separator such as described above enables low-cost acquisition of a polymer electrolyte fuel cell having excellent durability.

BRIEF DESCRIPTION OF THE DRAWING

In the accompanying drawing,
FIG. 1 is a schematic view illustrating the basic structure of a fuel cell.

DETAILED DESCRIPTION

The following provides a detailed description.
(1) Stainless Steel used as Substrate
No specific limitations are placed on the stainless steel used as the substrate in the disclosed stainless steel sheet for a separator of a polymer electrolyte fuel cell. However, a stainless steel sheet having excellent corrosion resistance (ferritic stainless steel sheet, austenitic stainless steel sheet, or dual-phase stainless steel sheet) is particularly advantageous.

For example, SUS447J1 (Cr: 30 mass %, Mo: 2 mass %), SUS445J1 (Cr: 22 mass %, Mo: 1 mass %), SUS443J1 (Cr: 21 mass %), SUS439 (Cr: 18 mass %), SUS316L (Cr: 18 mass %, Ni: 12 mass %, Mo: 2 mass %), or the like is suitable.

The sheet thickness of the stainless steel sheet for a separator is preferably 0.03 mm or more. The sheet thickness of the stainless steel sheet for a separator is preferably 0.3 mm or less. This is in view of the installation space and weight when stacking fuel cells. If the sheet thickness of the stainless steel sheet for a separator is less than 0.03 mm, the production efficiency of the stainless steel sheet declines. On the other hand, if the sheet thickness of the stainless steel sheet for a separator is more than 0.3 mm, the installation space and weight when stacking fuel cells increases. The sheet thickness of the stainless steel sheet for a separator is more preferably 0.03 mm or more and 0.1 mm or less.

(2) Sn Alloy Layer

With regards to the Sn alloy layer with which the surface of the substrate is coated, it is preferable to use a Sn alloy containing Ni or Fe that has excellent corrosion resistance in a use environment of separators for polymer electrolyte fuel cells (pH: 3 (sulfuric acid environment), use temperature: 80° C.). For example, $Ni_3Sn_2$, $Ni_3Sn_4$, FeSn, or $FeSn_2$ is preferable. The intermetallic compound $Ni_3Sn_2$ is particularly preferable.

The reason why these Sn alloys have excellent corrosion resistance in the use environment of separators for polymer electrolyte fuel cells is thought to be as follows.

Bonds such as Sn—Ni bonds or Sn—Fe bonds in a Sn alloy are more stable than Sn—Sn bonds in simple metal Sn, which improves corrosion resistance. In particular, $Ni_3Sn_2$ has a formation temperature in a high temperature range of 790° C. or higher according to a binary alloy phase diagram of Ni—Sn and forms very stable Sn—Ni bonds, which is thought to contribute to excellent corrosion resistance.

The thickness of the Sn alloy layer is preferably 5 μm or less in consideration of installation space and weight when stacking fuel cells. However, if the thickness of the Sn alloy layer is less than 0.1 μm, coating defects increase and corrosion resistance tend to deteriorate. Accordingly, the thickness of the Sn alloy layer is preferably 0.1 μm or more. The thickness of the Sn alloy layer is more preferably 0.5 μm or more. The thickness of the Sn alloy layer is more preferably 3 μm or less.

A plating method is suitable for the formation of the Sn alloy layer on the surface of the stainless steel substrate. In this case, a conventionally known plating method may be used to immerse the substrate in a plating bath adjusted to a predetermined composition and electroplate the substrate. Moreover, the Sn alloy layer may be formed after removing a passive film at the surface of the substrate by electrolytic treatment or the like.

(3) Microcrack Structure

In the disclosed stainless steel sheet for a separator of a polymer electrolyte fuel cell, it is essential that microcracks are formed in the Sn alloy layer in an amount of 10 or more microcracks per $cm^2$. This enables corrosion current to be dispersed in the microcracks and effectively inhibits concentration of the corrosion current even when a defect is generated in the Sn alloy layer, leading to exposure of the stainless steel substrate, and when an environment arises in which localized lowering of pH and concentration of chloride ions easily occur. Consequently, hole formation in the stainless steel substrate can be effectively prevented.

It is necessary for the Sn alloy layer to have 10 or more microcracks per $cm^2$ formed therein to effectively inhibit concentration of corrosion current and prevent hole formation in the stainless steel substrate. The Sn alloy layer preferably includes 100 or more microcracks per $cm^2$, and more preferably includes 1,000 or more microcracks per $cm^2$. However, if the Sn alloy layer includes more than 10,000 microcracks per $cm^2$, the Sn alloy layer may peel more easily from the substrate and corrosion resistance may deteriorate. Therefore, the Sn alloy layer preferably includes 10,000 or fewer microcracks per $cm^2$. The Sn alloy layer more preferably includes 8,000 or fewer microcracks per $cm^2$.

Herein, a microcrack is defined as a crack having a crack width that is at least 0.1 times the thickness of the Sn alloy layer and no more than 10 μm.

A microcrack having a crack width of less than 0.1 times the thickness of the Sn alloy layer does not reach the base material and does not enable dispersion of the corrosion current. On the other hand, the Sn alloy layer peels more easily from the substrate if numerous cracks having a crack width of more than 10 μm are present. The crack length is normally about 1 μm to 500 μm, but is not specifically limited to this range.

The crack width of the microcracks can be determined by, for example, observing the surface of the Sn alloy layer at ×5,000 magnification using a scanning electron microscope (SEM) and measuring the crack width (opening width) of an observed microcrack. The crack length can be determined by measuring the length of a line segment linking the ends of a microcrack observed in the same manner as described above (i.e., the length of a straight line between the ends of the crack). It should be noted that a branched crack or a crack having a shape formed through joining of cracks to one another is considered to be a single microcrack so long as it is connected. The crack length of this kind of microcrack is taken to be the length of a longest line segment among line segments linking ends of the crack.

Examples of methods that can be used to form the microcracks in the Sn alloy layer include a method in which a high-stress strike is used as a surface treatment, a method in which rolling by leveler, a skin pass rolling mill, or the like is carried out after coating, and a method in which strain is applied through bending.

It is necessary to make various adjustments to the microcrack formation conditions depending on the material and thickness of the stainless steel substrate, the thickness of the Sn alloy layer, and so forth. For example, in the case of a stainless steel sheet obtained by using a corrugator machine to form a wave shape (difference in height between protrusion and adjacent recess: 1.0 mm, distance between protrusions: 2.5 mm) on a stainless steel substrate (SUS447J1) of 0.05 mm in thickness, and by forming a Sn alloy layer of 1 μm to 2 μm in thickness on the surface thereof, microcracks can be appropriately formed in the Sn alloy layer through rolling with a load of 0.5 MPa to 10 MPa (more suitably, 1 MPa to 5 MPa).

(4) Strike Layer

A strike layer may be formed between the substrate made of stainless steel and the Sn alloy layer to improve adhesion. For example, a strike layer of Ni, Ni—P, Cu, Ag, Au, or the like may be formed by a commonly known technique and then the Sn alloy layer may be formed thereon. Moreover, the strike layer may be formed after removing a passive film at the surface of the substrate by electrolytic treatment or the like.

The coating weight of the strike layer is preferably 0.001 g/m² or more. The coating weight of the strike layer is preferably 1 g/m² or less. This is from a viewpoint of achieving a balance of adhesion and corrosion resistance. The coating weight of the strike layer is more preferably 0.003 g/m² or more. The coating weight of the strike layer is more preferably 0.5 g/m² or less. The coating weight of the strike layer is even more preferably 0.003 g/m² or more and 0.3 g/m² or less.

As a result of the coating weight being within any of the ranges set forth above, the effect of corrosion current dispersion to the microcracks can be maintained even when a strike layer such as described is formed.

(5) Sn-Containing Oxide Layer

In the disclosed stainless steel sheet for a separator, the surface of the Sn alloy layer may be coated with a Sn-containing oxide layer. This further improves corrosion resistance of the Sn alloy layer during long-term use in the use environment of a separator.

The Sn-containing oxide layer with which the surface of the Sn alloy layer is coated is not a natural oxide layer formed in the atmospheric environment but an oxide layer intentionally formed by a process such as immersion in an acidic solution. Note that the thickness of a natural oxide layer is typically about 2 nm to 3 nm.

The main component of the Sn-containing oxide layer is preferably $SnO_2$. The thickness of the Sn-containing oxide layer is preferably 5 nm or more. The thickness of the Sn-containing oxide layer is preferably 50 nm or less. The thickness of the Sn-containing oxide layer is more preferably 10 nm or more. The thickness of the Sn-containing oxide layer is more preferably 30 nm or less. An excessively thick Sn-containing oxide layer reduces conductivity. On the other hand, an excessively thin Sn-containing oxide layer does not achieve an effect of improving corrosion resistance in the use environment of a separator.

The Sn-containing oxide layer may be formed by a method of immersion in an acidic aqueous solution having oxidizing ability such as hydrogen peroxide or nitric acid, or a method of electrochemical anode electrolytic treatment. Other examples include physical vapor deposition (PVD), chemical vapor deposition (CVD), and coating.

Since the Sn-containing oxide layer normally has an extremely small thickness of about 5 nm to 50 nm, the Sn-containing oxide layer does not influence the effect of the microcracks or observation of the microcracks.

(6) Other Features

After forming the Sn alloy layer on the surface of the substrate made of stainless steel or after forming the Sn alloy layer with the strike layer in-between, a conductive layer with low electrical resistance may be further formed on the Sn alloy layer to improve conductivity, which is one of the required properties of a separator. For example, the Sn alloy layer or the Sn-containing oxide layer may be coated with a metal layer, a conductive polymer layer, an alloy layer containing conductive particles, or a polymer layer containing conductive particles to reduce the contact resistance.

EXAMPLES

Separators of polymer electrolyte fuel cells are used in a severe corrosion environment that has a temperature of about 80° C. and a pH of about 3, and that may also be contaminated with chloride ions from the external environment. Therefore, separators of polymer electrolyte fuel cells are required to have excellent anti-corrosion properties. In view of these required properties, the following evaluation was conducted on the subsequently described samples.

(1) Evaluation of Corrosion Resistance (Stability in Use Environment of Separator)

Typically, stainless steel is more susceptible to transpassive dissolution and suffers deterioration of corrosion resistance when the applied potential is higher. Moreover, in a situation in which chloride ions are present, there is a concern that pitting corrosion may occur and that a hole may be formed through the substrate. Corrosion resistance upon exposure to high potential and the presence of chloride ions in the use environment of a separator were evaluated as follows.

Each sample was immersed in a sulfuric acid aqueous solution containing 30 ppm of chloride ions at a temperature of 80° C. and a pH of 3, and was subjected to application of a constant potential of 0.9 V (vs. SHE) for 20 hours using Ag/AgCl (saturated KCl) as a reference electrode. Once 20 hours has passed, the formation of holes into the stainless steel substrate was inspected by eye. The current density after 20 hours was also measured. Corrosion resistance were evaluated based on the following criteria.

Excellent (pass, particularly good): No holes are formed in the stainless steel substrate and the current density after 20 hours is less than 0.015 $\mu A/cm^2$.

Good (pass): No holes are formed in the stainless steel substrate and the current density after 20 hours is 0.015 $\mu A/cm^2$ or more, but less than 0.2 $\mu A/cm^2$.

Poor (fail): A hole is formed in the stainless steel substrate and/or the current density after 20 hours is 0.2 $\mu A/cm^2$ or more.

Example 1

Each of SUS447J1 (Cr: 30 mass %, Mo: 2 mass %), SUS445J1 (Cr: 22 mass %, Mo: 1 mass %), and SUS316L (Cr: 18 mass %, Ni: 12 mass %, Mo: 2 mass %) having a sheet thickness of 0.05 mm was corrugated into a wave shape (difference in height between protrusion and adjacent recess: 1.0 mm, protrusion and recess distance: 2.5 mm). The corrugated product was used as a stainless steel substrate. The corrugation imitated the shape of a typical separator material and also imitated generation of surface defects, such as scratches and surface roughness, that are generated in production of the stainless steel substrate or forming of the stainless steel substrate into a desired shape.

The stainless steel substrate obtained as described above was subjected to appropriate pretreatment such as degreasing. Thereafter, a Sn alloy layer having the average thickness shown in Table 1 was formed on the stainless steel substrate using the following plating bath composition and plating conditions to obtain a stainless steel sheet for a separator.

For some of the samples, a strike layer with the average coating weight shown in Table 1 was formed on the stainless steel substrate using the following plating bath composition and plating conditions, prior to formation of the Sn alloy layer.

Furthermore, for some of the samples, a Sn-containing oxide layer was formed on the surface of the Sn alloy layer by, after formation of the Sn alloy layer, passing current through the resultant stainless steel sheet with a current density of +0.5 mA/cm² for 5 minutes while in a sulfuric acid aqueous solution of a temperature of 60° C. and a pH of 2.

Various stainless steel sheets for separators obtained as described above were subjected to microcrack formation treatment by rolling under a load of 0.5 MPa to 20 MPa to form microcracks. The microcrack formation treatment was carried out either after formation of the Sn alloy layer or after formation of the Sn-containing oxide layer.

The coating weight of the strike layer, the average thickness of the Sn alloy layer, and the average thickness of the Sn-containing oxide layer were each regulated by determining the relationship with the plating time or the anode electrolysis time beforehand.

The average number of microcracks was measured by the following method. First, each sample obtained by forming the Sn alloy layer on the surface of the stainless steel substrate (thickness: 0.05 mm) and then performing the above-described microcrack formation treatment was cut to about 20 mm W×20 mm L. Next, the surface of the Sn alloy layer in the cut sample was randomly observed at ×100 to ×5,000 magnification using a scanning electron microscope (SEM). The number of observed microcracks was counted and the number of microcracks per 1 cm$^2$ was calculated. This measurement was performed on five samples that were each cut to the shape described above from the same sample obtained after Sn alloy layer formation and microcrack formation treatment. An average value for these five samples was taken to be the average number of microcracks. Note that only cracks having a width of at least 0.1 times the thickness of the Sn alloy layer and no more than 10 μm, and having a crack length of at least 1 μm and no more than 500 μm, were determined to be microcracks. Furthermore, a branched crack or a crack having a shape formed through joining of cracks to one another was determined to be a single microcrack so long as it was connected.

The coating weight of the strike layer was measured by the following method. First, each sample obtained by forming the strike layer on the surface of the stainless steel substrate (thickness: 0.05 mm) was cut to about 50 mm W×50 mm L. The lengths of two sides of the cut sample were measured by a vernier caliper and the sample area was calculated. The sample was then immersed for 10 minutes in a solution in which the strike layer could be dissolved (a known dissociation solution may be used, such as 30% nitric acid for Ni or Ni—P strike) to dissolve the strike layer. One or more constituent elements of the strike layer dissolved in the solution were quantified using an inductively coupled plasma (ICP) emission spectrometric analyzer, and this quantity was divided by the sample area to calculated the coating weight (g/m$^2$).

The average thickness of the Sn alloy layer was measured by the following method. First, each sample obtained by forming the Sn alloy layer on the surface of the substrate (thickness: 0.05 mm) was cut to about 10 mm W×15 mm L. The sample was then embedded in resin, polished in the cross section, and observed using a scanning electron microscope (SEM) to measure the thickness of the Sn alloy layer. The measurement of the thickness of the Sn alloy layer was performed on 10 samples that were each cut to the shape described above from the same sample obtained after Sn alloy layer formation. An average value for the 10 samples was taken to be the average thickness of the Sn alloy layer.

The composition of the Sn alloy layer was identified by an energy-dispersive X-ray spectrometer (EDX) and X-ray diffractometer (XRD) used in the SEM observation.

The average thickness of the Sn-containing oxide layer was measured by the following method. First, each sample obtained by forming the strike layer, the Sn alloy layer, and the Sn-containing oxide layer on the surface of the substrate (thickness: 0.05 mm) was processed by a focused ion beam to prepare a thin film for cross-sectional observation. The produced thin film for cross-sectional observation was then observed using a transmission electron microscope (TEM) to measure the average thickness of the Sn-containing oxide layer. In the measurement of the thickness of the Sn-containing oxide layer, the thickness of the Sn-containing oxide layer in the prepared thin film for cross-sectional observation was measured at three locations. An average value for the three locations was taken to be the average thickness of the Sn-containing oxide layer.

The composition of the oxide layer was identified by an energy-dispersive X-ray spectrometer (EDX) and X-ray photoelectron spectrometer (XPS) used in the TEM observation.

(Plating Bath Composition and Plating Conditions for Strike Layer)
<Ni Strike>
  Nickel chloride: 240 g/L
  Hydrochloric acid: 125 mL/L
  Temperature: 50° C.
  Current density: 5 A/dm$^2$
<Ni—P Strike>
  Nickel sulfate: 1 mol/L
  Nickel chloride: 0.1 mol/L
  Boric acid: 0.5 mol/L
  Sodium phosphite: 0.05 mol/L to 5 mol/L
  Temperature: 50° C.
  Current density: 5 A/dm$^2$ (Plating Bath Composition and Plating Conditions for Sn Alloy Layer)
<Ni$_3$Sn$_2$>
  Nickel chloride: 0.15 mol/L
  Tin chloride: 0.15 mol/L
  Potassium pyrophosphate: 0.45 mol/L
  Glycine: 0.15 mol/L
  Temperature: 60° C.
  Current density: 1 A/dm$^2$
<Ni$_3$Sn$_4$>
  Nickel chloride: 0.15 mol/L
  Tin chloride: 0.30 mol/L
  Potassium pyrophosphate: 0.45 mol/L
  Temperature: 60° C.
  Current density: 1 A/dm$^2$
<FeSn>
  Iron chloride: 0.15 mol/L
  Tin chloride: 0.18 mol/L
  Potassium pyrophosphate: 0.45 mol/L
  Temperature: 60° C.
  Current density: 1 A/dm$^2$
<FeSn$_2$>
  Iron chloride: 0.15 mol/L
  Tin chloride: 0.36 mol/L
  Potassium pyrophosphate: 0.45 mol/L
  Temperature: 60° C.
  Current density: 1 A/dm$^2$ In this disclosure, a plating bath composition other than the above may be used according to a commonly known plating method as long as a desired plating can be formed.

Table 1 summarizes the evaluation results of corrosion resistance (stability in use environment of separator) for each sample obtained as described above.

TABLE 1

| Sample No. | Substrate | Strike layer Type | Strike layer Coating weight (g/m²) | Sn alloy layer Main component | Sn alloy layer Average thickness (μm) | Sn alloy layer Average number of microcracks (cracks/cm²) | Sn-containing oxide layer Main component |
|---|---|---|---|---|---|---|---|
| 1 | SUS447J1 | None | — | $Ni_3Sn_2$ | 1 | — | — |
| 2 | | | | | 1 | 12 | — |
| 3 | | | | | 1 | 300 | — |
| 4 | | | | | 1 | 2500 | — |
| 5 | | | | | 2 | 8700 | — |
| 6 | | Ni strike | 0.03 | | 1 | 100 | — |
| 7 | | | 0.21 | | 1 | — | — |
| 8 | | Ni—P strike | 0.02 | | 1 | 15 | — |
| 9 | | | 0.08 | | 1 | 200 | $SnO_2$ |
| 10 | | | 0.15 | | 1 | 2800 | $SnO_2$ |
| 11 | SUS445J1 | None | — | $Ni_3Sn_2$ | 1 | 2400 | — |
| 12 | | Ni strike | 0.02 | $Ni_3Sn_4$ | 1 | 2500 | — |
| 13 | | | 0.05 | FeSn | 1 | 2200 | — |
| 14 | SUS316L | None | — | $Ni_3Sn_4$ | 1 | 2600 | — |
| 15 | | Ni—P strike | 0.01 | $FeSn_2$ | 1 | 2200 | — |
| 16 | | | 0.03 | $Ni_3Sn_2$ | 1 | 2800 | — |

| Sample No. | Sn-containing oxide layer Average thickness (nm) | Microcrack formation treatment load (MPa) | Hole formation in substrate after 20 hours (yes/no) | Current density after 20 hours (μA/cm²) | Evaluation of corrosion resistance | Remarks |
|---|---|---|---|---|---|---|
| 1 | — | No treatment | Yes | — | Poor | Comparative Example |
| 2 | — | 0.5 | No | 0.018 | Good | Example |
| 3 | — | 1 | No | 0.022 | Good | Example |
| 4 | — | 5 | No | 0.026 | Good | Example |
| 5 | — | 10 | No | 0.047 | Good | Example |
| 6 | — | 1 | No | 0.024 | Good | Example |
| 7 | — | No treatment | Yes | — | Poor | Comparative Example |
| 8 | — | 0.5 | No | 0.021 | Good | Example |
| 9 | 5 | 1 | No | 0.013 | Excellent | Example |
| 10 | 5 | 5 | No | 0.027 | Good | Example |
| 11 | — | 5 | No | 0.045 | Good | Example |
| 12 | — | 5 | No | 0.047 | Good | Example |
| 13 | — | 5 | No | 0.055 | Good | Example |
| 14 | — | 5 | No | 0.076 | Good | Example |
| 15 | — | 5 | No | 0.085 | Good | Example |
| 16 | — | 5 | No | 0.074 | Good | Example |

The table reveals the following points.

(a) The samples of Examples did not have holes formed in the substrates thereof after 20 hours in evaluation of corrosion resistance and thus all demonstrated good corrosion resistance even upon long-term exposure to high potential and the presence of chloride ions, as in the use environment of a separator.

(b) Samples No. 1 and No. 7 of Comparative Examples were not subjected to microcrack formation treatment and, as a result, had holes formed in the substrates thereof after 20 hours in evaluation of corrosion resistance, and thus did not demonstrate the desired corrosion resistance.

REFERENCE SIGNS LIST 1 membrane-electrode joined body
2, 3 gas diffusion layer
4, 5 separator
6 air passage
7 hydrogen passage

The invention claimed is:

1. A stainless steel sheet for a separator of a polymer electrolyte fuel cell, comprising:
    a substrate made of stainless steel; and
    a Sn alloy layer with which a surface of the substrate is coated, wherein
    the Sn alloy layer includes 10 or more and 10,000 or fewer microcracks per cm² on a surface thereof to inhibit localized corrosion of the substrate, and
    each microcrack has a crack width of at least 0.1 times a thickness of the Sn alloy layer and no more than 10 μm, and a crack length of at least 1 μm and no more than 500 μm.

2. The stainless steel sheet for a separator of a polymer electrolyte fuel cell according to claim 1, wherein
    the Sn alloy layer contains at least one element selected from Ni and Fe.

3. The stainless steel sheet for a separator of a polymer electrolyte fuel cell according to claim 1, wherein
    the Sn alloy layer contains $Ni_3Sn_2$.

4. The stainless steel sheet for a separator of a polymer electrolyte fuel cell according to claim 1, further comprising a strike layer between the Sn alloy layer and the substrate made of stainless steel.

5. The stainless steel sheet for a separator of a polymer electrolyte fuel cell according to claim 1, further comprising a Sn-containing oxide layer on a surface of the Sn alloy layer.

6. The stainless steel sheet for a separator of a polymer electrolyte fuel cell according to claim 2, wherein the Sn alloy layer contains $Ni_3Sn_2$.

7. The stainless steel sheet for a separator of a polymer electrolyte fuel cell according to claim 2, further comprising a strike layer between the Sn alloy layer and the substrate made of stainless steel.

8. The stainless steel sheet for a separator of a polymer electrolyte fuel cell according to claim 3, further comprising a strike layer between the Sn alloy layer and the substrate made of stainless steel.

9. The stainless steel sheet for a separator of a polymer electrolyte fuel cell according to claim 6, further comprising a strike layer between the Sn alloy layer and the substrate made of stainless steel.

10. The stainless steel sheet for a separator of a polymer electrolyte fuel cell according to claim 2, further comprising a Sn-containing oxide layer on a surface of the Sn alloy layer.

11. The stainless steel sheet for a separator of a polymer electrolyte fuel cell according to claim 3, further comprising a Sn-containing oxide layer on a surface of the Sn alloy layer.

12. The stainless steel sheet for a separator of a polymer electrolyte fuel cell according to claim 4, further comprising a Sn-containing oxide layer on a surface of the Sn alloy layer.

13. The stainless steel sheet for a separator of a polymer electrolyte fuel cell according to claim 6, further comprising a Sn-containing oxide layer on a surface of the Sn alloy layer.

14. The stainless steel sheet for a separator of a polymer electrolyte fuel cell according to claim 7, further comprising a Sn-containing oxide layer on a surface of the Sn alloy layer.

15. The stainless steel sheet for a separator of a polymer electrolyte fuel cell according to claim 8, further comprising a Sn-containing oxide layer on a surface of the Sn alloy layer.

16. The stainless steel sheet for a separator of a polymer electrolyte fuel cell according to claim 9, further comprising a Sn-containing oxide layer on a surface of the Sn alloy layer.

* * * * *